April 6, 1965 R. S. WILKES 3,176,832
MATERIAL CONVEYOR
Filed June 14, 1962 4 Sheets-Sheet 1
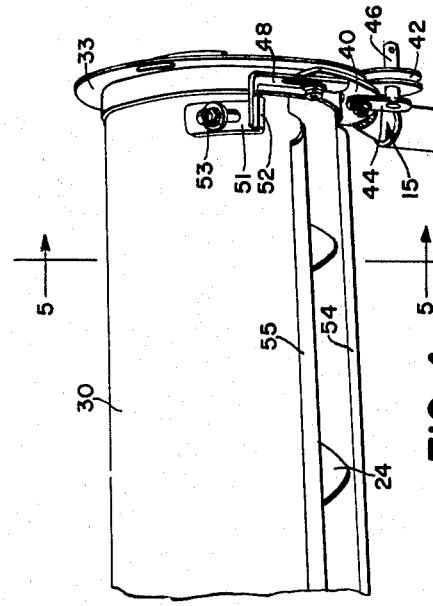
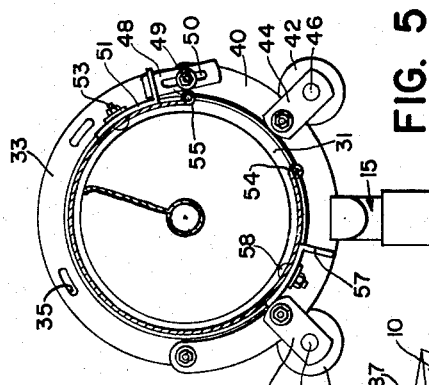
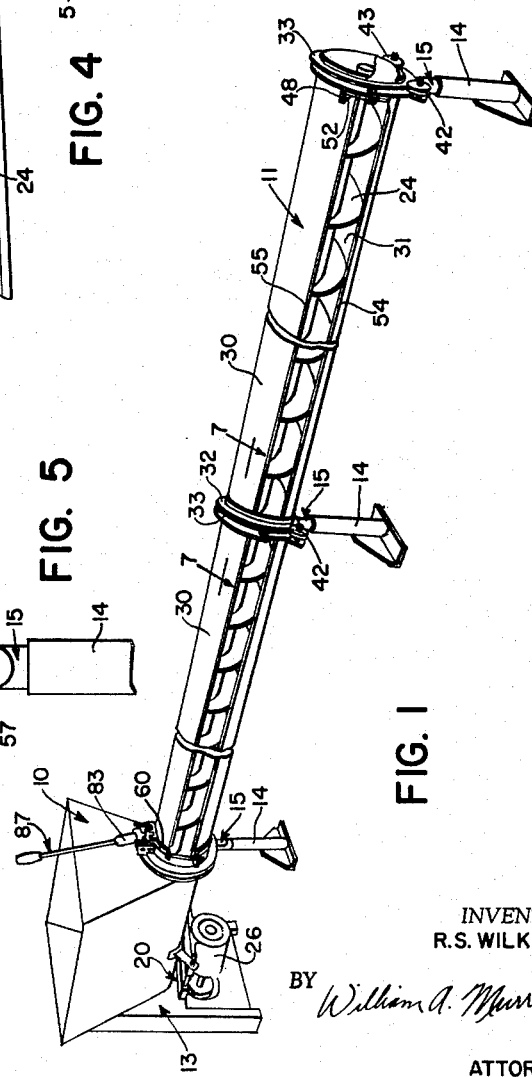
INVENTOR.
R.S. WILKES
BY William A. Murray
ATTORNEY April 6, 1965  R. S. WILKES  3,176,832
MATERIAL CONVEYOR Filed June 14, 1962  4 Sheets-Sheet 2

INVENTOR.
R.S. WILKES
BY William A. Murray

ATTORNEY

April 6, 1965 R. S. WILKES 3,176,832
MATERIAL CONVEYOR
Filed June 14, 1962 4 Sheets-Sheet 3

INVENTOR.
R.S. WILKES
BY William A. Murray
ATTORNEY

April 6, 1965   R. S. WILKES   3,176,832
MATERIAL CONVEYOR

Filed June 14, 1962   4 Sheets-Sheet 4

INVENTOR.
R.S.WILKES
BY William A Murray
ATTORNEY

United States Patent Office 3,176,832
Patented Apr. 6, 1965

3,176,832
MATERIAL CONVEYOR
Raymond S. Wilkes, Moline, Ill., assignor to Deere & Company, Moline, Ill., a corporation of Delaware
Filed June 14, 1962, Ser. No. 202,561
4 Claims. (Cl. 198—213)

This invention relates to a material feeding device and more particularly to a device commonly referred to in the agricultural trade as a bunk feeder.

In the conventional type of bunk feeder, there is provided an elongated auger extending outwardly from the base of a feed box or hopper through an elongated auger housing mounted over a feeding bunk for livestock. The tube or auger housing is supported over the bunk and it is conventional to provide in the auger tube a series of longitudinally spaced openings through which material may be discharged into the bunk. For purposes of maintaining a substantially equal amount of feed into the bunk throughout the length of the tube, the feed openings are disposed at progressively lower heights in inverse relation to their distance from the hopper or feed box.

In the conventional type of bunk feeder as above described, the holes are permanently placed in relation to the auger. Consequently there are created problems when the type of material fed through the bunk feeder is changed. For example, the same type of openings and the positioning of the openings which could best be used for the movement of shelled corn would not necessarily be astisfactory for the movement of silage or other less granular material. Consequently there exists a problem of properly positioning the holes for all types of material.

With the above in mind, it is the primary object of the present invention to provide a new and novel type of bunk feeder which includes a hopper or feed box and an elongated tube assembly housing an auger projecting from the feed box. The tube assembly is composed of a series of auger tubes interconnected at their ends with each tube having a side slot extending its entire length. The tubes are joined at their ends by suitable structure causing the slots to be alined longitudinally and generally in a horizontal position unless otherwise adjusted. The structure for joining the adjoining ends of the tubes is composed of annular or ring structure having a portion thereof bridging the expanse of the slots so as to reenforce the tubes at the junctures. In two forms of the invention the portion bridging the slots will be offset from the tubes so as to permit material to pass the structure without hairpinning or catching on that portion.

It is a further object of the invention to provide stop or limiting means at the remote end of the tube assembly preventing the slots in the tube assembly from moving beyond a predetermined side discharge position. The limiting means operates in combination with a tube adjusting mechanism at the opposite or intake end of the tube assembly that operates to swivel the tube relative to the remote end as well as the material hopper or feed box. Consequently in normal operation the tube assembly has the lower lips of the slots in the tube assembly continuous and the lower lip may be adjusted to be inclined from a high end adjacent the hopper to a low end adjacent the limiting or stop means at the remote end of the tube assembly. In this manner the material fed through the auger will gradually be discharged as it moves from opposite ends of the tube assembly.

It is still a further object of the present invention to provide sufficient adjusting means at the intake end of the tube assembly to permit the inclination of the lower lip in the continuous slot to be adjusted so as to best discharge the type of material being moved through the bunk feeder.

Other objects and advantages of the present invention will become apparent to those skilled in the art as the nature of the invention is better understood from the following description and as shown in the accompanying drawings.

FIG. 1 is a side perspective view of the bunk feeder including both the hopper and an auger discharge conveyor.

FIG. 4 is a side view of the remote end of the auger and discharge conveyor.

FIG. 5 is a sectional view taken substantially along the line 5—5 of FIG. 4.

FIG. 6 is a sectional view taken substantially along the line 6—6 of FIG. 3.

Figure 2:
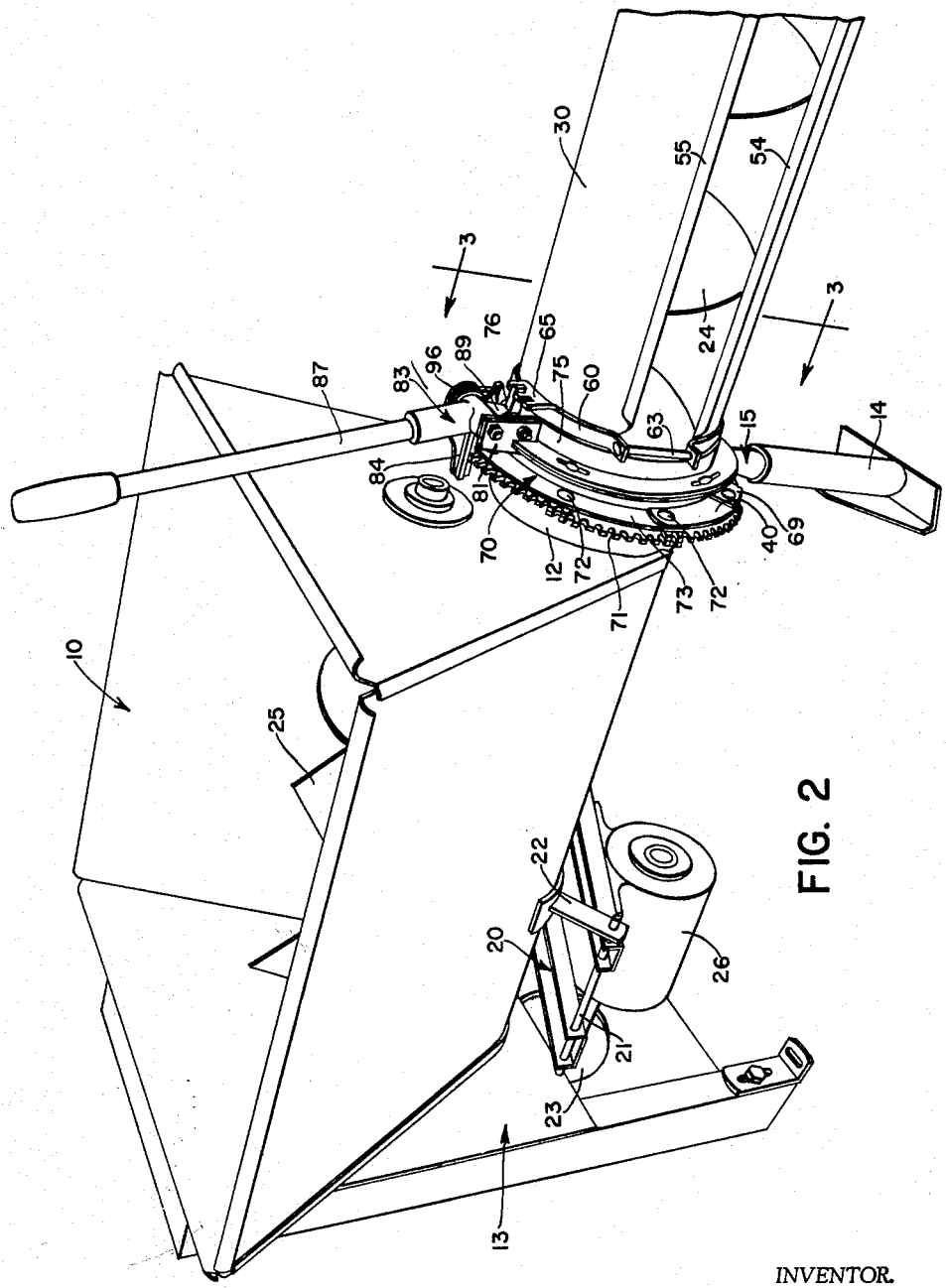
FIG. 2 is an enlarged side perspective view of the material feed box and a portion of the auger discharge conveyor.
Figure 3:
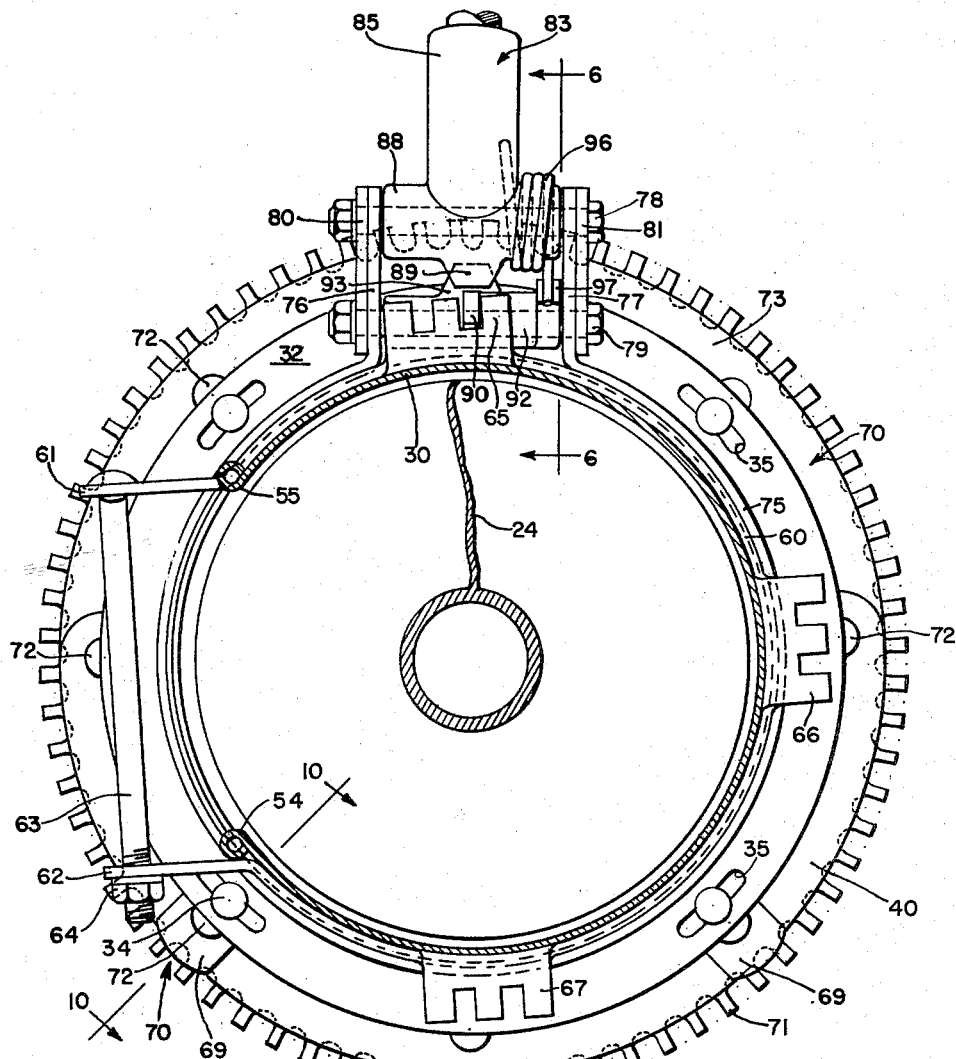
FIG. 3 is a sectional view taken substantially along the line 3—3 of FIG. 2.
Figure 10:
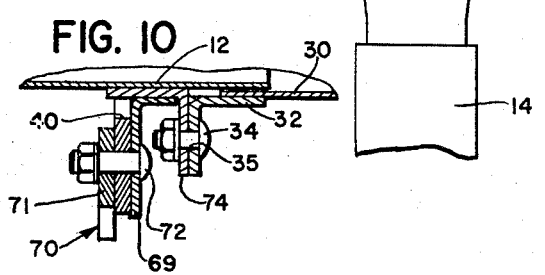
FIG. 10 is a sectional view taken along the line 10—10 of FIG. 3.

A bunk feeder includes the hopper or feed box 10 with a lower portion thereof opening into an elongated auger tube assembly, indicated in its entirety by the reference numeral 11. The hopper 10 includes a short tubular section 12 connected to an adjacent end of the tube assembly 11 in a manner later to be explained. The hopper is supported by upright frame structure 13 and the tube assembly 11 is supported by axially spaced base supports 14 with each having an upper Y-shaped support 15 which cradles beneath the respective tubular sections. The support 13 and base supports 14 would normally be supported on a bunk feeder. In this respect, it should be recognized that other types of support would be sufficient, and such is shown only for purposes of clarifying the invention. For example, an overhead support for the tubular assembly 11 as well as the hopper 10 would suffice.

On the under side of the hopper 10 is a motor frame 20 pivotally mounted to swing vertically on a pivot rod 21 carried on the support 13 and a bracket 22 fixed to the underside of the hopper 10. A motor 26 is carried on the motor support 20 and has thereon a drive pulley 23 which drives an auger shaft, not shown, but clearly indicated in its location by auger flighting 24. The weight of the motor 26 maintains tension in the belt drive that extends from the auger drive shaft to the pulley 23. An agitator mechanism, indicated only partially at 25, is provided above the auger flight 24 that projects into the hopper 10.

Figure 7:
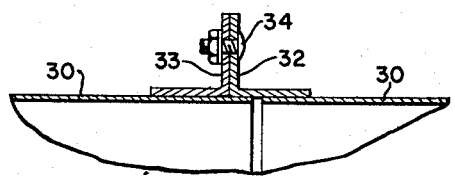
FIG. 7 is a sectional view taken substantially along the line 7—7 of FIG. 1.

The tube assembly 11 is composed of a plurality of auger tubes 30 disposed in end to end relation with each having a continuous slot 31 through which material may be discharged by the auger flighting 24. Each tube 30 has at opposite ends annular rings or members 32, 33 completely surrounding the auger tubing 30 and bridging the slot 31 of the respective tube 30. The rings 32, 33 are composed in cross-section of angle irons with one of their flanges being fixed to the auger tubings 30 and radial flanges lying adjacent one another. The rings 33 are offset from the end of the tube 30, as is clearly indicated in FIGS. 1 and 7, and the annular member 32 is offset beyond the end of the tube 30. In effect, therefore, the annular member 32 forms with its offset portion of the tube the female portion and the annular member 33 forms with the end of the tube 30 the male portion of the juncture between adjacent ends of the tubes 30 and creates an overlapping relation as is shown in FIG. 7. It will also be noted that the extended portion beyond the annular ring 33 is considerably shorter than the offset portion of the tube 30 from the vertical flange of the annular member 32 so as to prevent a snug or abutting fit between the vertical flanges of the annular members 32, 33. As may be seen from FIG. 8, the rings 32, 33 of the adjoining ends are bolted, as at 34, to lock the two tubes together. The rings 32, 33 have elongated slots 35 receiving the bolts and permitting a degree of angular adjustment between the adjoining ends of the tubes 30. The purpose of the slots 35 is to overcome manufacturing tolerances in the tubes 30 so that the elongated slots 31 of each successive tube will be properly alined with one another.

Adjacent each juncture in the tubular assembly is one of the aforementioned base stands 14 and a Y-shaped support 15 which telescopes in the base stand 14. The Y-shaped supports flare outwardly in arcuate shaped cradle portions 40 which underlie the underside of the tubes 30. Generally the portions 40 are closely adjacent to the tubes but are normally out of contact therewith. The portions 40 support the tubes by means of guide rolls 41, 42 on opposite sides of the supports 15, and carried on the arcuate portions 40 by means of brackets 43, 44. The rolls or guides 41, 42 have annular grooves receiving the edges of the radial flanges of annular rings 32, 33, so that the entire tube assembly may be rotated on the rolls 41, 42. The rolls 41, 42 are rotatably supported on the brackets 43, 44 by axially extending rods 45, 46 respectively.

Referring now to FIG. 5 which shows the remote end of the auger assembly, the upper portion 40 of the U-shaped support 15 is provided with a stop or limiting means in the form of an L-shaped bracket 48 having one flange of the L lying adjacent to the portion 40 and bolted thereto at 49. The flange adjacent the portion 40 is slotted at 50 to receive the bolt 49. A laterally extending flange of the L-shaped bracket projects alongside the adjacent tube 30. Bolted at 53 to the outer surface of the tube 30 is a stop engaging bracket 51 with a radially outwardly projecting leg portion 52 disposed to engage the lateral flange of the L-shaped bracket 48. The bracket 48 and outwardly extending portion 52 will limit rotation of the tubes 30 in a counterclockwise direction as viewed in FIG. 5. This, of course, will limit the maximum upper position of edges or lips 54, 55 on the tube section 30. It should be recognized that the limiting means 48 may be on either side of the arcuate portion. A second bracket 57 is bolted at 58 to the tube 30 adjacent the lip 54 so as to limit movement of the tube when the slot 31 opens to the other side. It is therefore obvious the entire auger tubing may be rotated to a position in which the slot 31 opens to the opposite side of the tubing 30 and the lip 55 defining the other edge of the slot 31 may then be in the lower position. However, regardless of the location of the brackets, 48, 51 and 57, the purpose thereof is to limit rotation of the auger tube 30 at the remote end of the tube assembly.

A C-shaped clamp 60 is provided on the end of the tube 30 adjacent the feed box 10. The clamp 60 has a pair of laterally outwardly extending and vertically separated flanges 61, 62 bolted, at 63, together, the bolt 63 and its respective nut 64 effecting a tight fit between the clamp 60 and the outer surface of the tube 30. The clamp 60 has three angularly spaced toothed portions 65, 66, 67 spaced 90° apart and around the surface of the tube 30. An annular toothed structure 70 is provided on the outer end of the tube portion 12 which discharges material from the hopper 10. The toothed structure 70 is composed of a series of annular sections 71, bolted, or otherwise fixed, together, as at 72 to provide the continuous ring around the surface of the tubular section 12.

A ring 75 is provided to slidably engage the top surface of the flange of the annular ring 32 which fits adjacent the end of the tube 30. The sliding ring 75 has a pair of integral upwardly projecting portions 76, 77 through which extends pivot bolt and nut combinations 78, 79 respectively. A pair of backing plates 80, 81 is provided outwardly of and adjacent the outer surfaces of the upwardly projecting portions 76, 77 and also have openings to receive the bolt and nut combinations 78, 79. The arcuate members 71, while surrounding the tube section 12, are spaced therefrom and are fixed in a position by an angular ring structure composed of the arcuate section 40 and a semi annular strap 73, the latter being connected to the upper ends of the portion 40 by bolts 72. The arcuate portion 40 supports the tube section 12 by means of a pair of L-shaped brackets 69, one flange of each being welded to the underside of the ring 74 and the other flange of each being connected by the bolts 72 to the portion 40.

Mounted on the upper pivot bolt 78 is a bell crank casting 83 having one leg portion 84 adapted to engage the teeth on the members 71 and an upwardly projecting portion 85 adapted to be pinned at 86 to an upwardly projecting arm or lever 87. The bell crank casting 83 is provided with a hub 88 pivoted on the bolt 78. Integral with the hub portion 88 is a downwardly projecting lug 89. Viewing FIGS. 1, 2, 3 and 6, it becomes apparent that the portion 84 may be moved in and out of engagement with the teeth and also the entire lever mechanism may be moved angularly about the outer surface of the tube 30.

Mounted on the lower bolt and nut combination 79 is a tooth engaging member 90 which has a projecting portion 91 normally in engagement with the teeth of one of the portions 65–67. The member 90 has a hub portion 92 mounted on the shank of the bolt 79 and an upwardly projecting lug portion 93 which sets behind the lug 89 of the casting 83. The casting 83 is provided with a projecting portion 95 which has an opening to receive one end of a torsion spring 96. The opposite end of the torsion spring 96 bears against the radial leg 97 that is integral with the ear engaging member 90. As may be clear from viewing FIG. 6, the torsion spring 96 operates to both bias the portion 84 into engagement with the teeth of the arcuate members 71 and also bias the teeth engaging portions 91 into engagement with the respective teeth of one of the portions 65–67.

The bunk feeder as above described operates in the following manner. Assuming it is desired to feed material from the right side of the auger as the bunk feeder is viewed from the hopper end, the stop bracket 48 is positioned as shown in FIG. 5 and the engaging bracket 51 is fixed to the auger tube in the manner shown in FIG. 5. This will limit the amount of rotation of the auger tube at the remote end of the tube assembly 30. In order to create a relatively even distribution of material over the lower lip 54, it is necessary to raise the lip 54 in an inclined position with the highest point being adjacent the hopper 10. Therefore, it is necessary to move the lever 87 out of engagement with the teeth of the arcuate members 71 and to move that end of the auger tube angularly about its axis until the desired angle of inclination of the lower lip 54 is reached. At this time the portion 84 may be reinserted in the teeth of the member 71 and the entire tube assembly is locked in position at the desired angle of inclination. Since the ring 75 is slidably movable around the flange of the ring 33, the only feature which locks it against rotation relative thereto is the portion 91 residing in a position between the teeth of the tooth portion 65. However, once positioned in the tooth portion, the entire ring 75 is locked and the entire tube assembly will at that end of the tube assembly rotate in accordance with the angular movement of the lever 87.

Should it be desired to discharge downwardly or to the opposite side of the auger tube, the lever 87 is moved to a position in which the portion 84 is clear of the teeth in the arcuate member 71 and the lug portion 89 engages the lug portion 93. Further movement of the lever 87 will cause the portion 91 to clear the teeth of the toothed portion 65 whereupon the entire ring or clamp 75 may be swung angularly about the tube without affecting movement thereof. If it is desired to move the tube so that the slot moves downwardly, the ring 75 is moved into a position opposite the toothed portion 66 and the portion 91 is permitted to re-establish its engagement with the teeth of the portions 66. The lever is then swung upwardly to rotate the tube assembly 11 until the slot 31 opens downwardly. The projecting portion 84 is then permitted to reinsert itself in the respective teeth of the arcuate portions 71. While normally it is not desired to angulate the lips 54, 55 when the slot opens downwardly, it will be desired to do so when the slot 31 opens to the opposite side of the auger tube. When the latter is desired, the stop bracket or limiting means 48 is positioned on the opposite leg of the Y-shaped support 15. The lever structure 83 is then positioned to engage the toothed portion 67 and to disengage the teeth of the arcuate portions 71 and the entire tube is swung arcuately until the tooth portion 67 is on the top side of the tube. As is obvious in viewing FIG. 3, this will move the slot to the opposite side of the tube. To angle the then lower lip 55, the limiting means will be so positioned to limit raising the lip 55 at that end of the tube. Further angular movement of the lever 87 will give the proper inclination of the lip 55.

Figure 8:
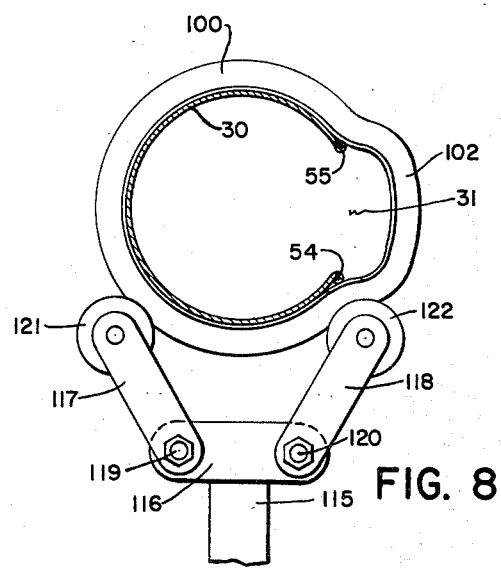
FIG. 8 is a view somewhat similar to FIG. 5 but showing a modification of the invention.
Figure 9:
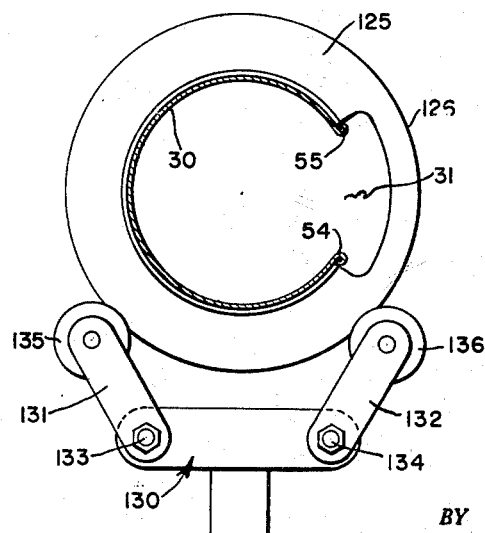
FIG. 9 is a view somewhat similar to FIG. 5 but showing still a further modification of the invention.

In the forms shown in FIGS. 8 and 9 there is provided rings of different configurations than those shown and described previously at 32. The rings 100 of the modification shown in FIG. 8 has outwardly offset portions 102 bridging the expanse of the slot 31. The purpose of having the portion 102 offset is to permit material which has a natural tendency to catch or bind around the bridging portion of the ring structure to pass inwardly of the portion 102 without such binding occurring. For example, if it is desired to auger haylage, in the previous form it is possible in some conditions to create a clogging condition adjacent the juncture or joints between the tubes 30. By providing the offset portion 102, sufficiently away from the tubes 30, the clogging condition will be more or less eliminated.

For purposes of guiding the auger tubes for rotation in this modification, a slight modification in the supports is also provided. A T-shaped support 115 is provided to be telescoped in the main base 14 in a manner previously described and has a short bar section 116 at the upper end. Opposite ends of the bar 116 support brackets 117, 118 which may be adjusted vertically merely by loosening connecting bolts 119, 120 and repositioning the brackets to the desired position. The brackets 117, 118 carry rolls or guides 121, 122 which engage the outer edges of the ring 100. The brackets 117, 118 and the respective rolls 121, 122 may be adjusted vertically and outwardly in order to accommodate the offset portion 102 of the rings.

Referring to the modification in FIG. 9, rings 125 surrounding the joint or juncture of two tube sections 30 has outer annular edges 126. The rings 125 have inner recessed sections 127 opposite the slot 31 so as to permit the material to be fed through the tubes 30 with minimum contact with the rings 125 at the juncture of the tubes.

An enlarged version of the Y-shaped support 15 as previously described may be used to support the tube assembly 11. However the preferred form includes a T-shaped support 130 with roll supporting brackets 131, 132 extending upwardly and outwardly from opposite sides thereof. The brackets are bolted at 133, 134 to the support 130 and carry guide rolls 135, 136 that engage the outer annular edges 126 of the rings 125.

While only three preferred forms of the invention have been shown, it should be recognized that other forms and variations will occur to those skilled in the art. Therefore it should be understood that while the preferred form of the invention was shown in concise and detailed manner for the purpose of completely illustrating the principles of the invention, it was not the intention to so limit or narrow the invention beyond the broad concepts set forth in the appended claims.

What is claimed is:

1. In a bunk feeder having an elongated auger tube assembly with a continuous slot extending from one end to the other end with a lower lip over which material may be discharged and an auger flighting within the tube assembly, the improvement residing in track structures extending around the tube assembly outwardly thereof, each of the track structures having a continuous outer track spaced from the tube assembly and a radial flange extending inwardly from the track and fixed to the surface of the tube assembly, the radial flange having a radially outward recess across the expanse of the slot.

2. The invention defined in claim 1 in which each of the radial flanges has an inner edge with a circular part thereof engaging and fixed to the surface of the tube assembly and the recess has an inner edge offset radially outwardly from the circular part.

3. The invention defined in claim 2 in which the track is completely circular and further characterized by supports for the tube assembly having guide means thereon engaging the track.

4. In a bunk feeder having auger means including an auger tube assembly composed of a plurality of auger tubes disposed in end to end relation, with each having therein a continuous slot extending between opposite ends with vertically spaced-apart horizontal lips over which material may be discharged, a ground support at the junctures of the tubes, a material feeding means at one end of the assembly, and torsional load applying means operatively connected to the tube assembly to angularly position and to incline the slot, the combination therewith of track structure for joining the adjoining ends of the tubes, each track structure comprising an outer annular track at one end of a tube engageable with a ground support for angular movement and completely surrounding the tube, said track being spaced radially from the tube surface at the respective end, and a radial flange extending inwardly from the track and fixed to the surface of the respective tube and adapted for connection to a radial flange on the end of the adjoining tube so as to retain substantial longitudinal alinement of the slots in the adjacent tubes, the radial flange being recessed radially outwardly across the expanse of the slot.

References Cited by the Examiner

UNITED STATES PATENTS

| | | | |
|---|---|---|---|
| 559,338 | 4/96 | Lorenz | 198—213 |
| 2,630,906 | 3/53 | Philipp | 198—64 |
| 2,867,314 | 1/59 | Hansen | 198—64 |
| 2,921,670 | 1/60 | Albers | 198—213 |
| 2,938,385 | 8/60 | Todd | 198—213 |
| 3,001,633 | 9/61 | Heitshu | 198—64 |
| 3,037,611 | 6/62 | Majorowicz | 198—64 |
| 3,107,005 | 10/63 | Cauffman | 198—213 |
| 3,111,115 | 11/63 | Best | 198—64 |

SAMUEL F. COLEMAN, *Acting Primary Examiner.*

ARNOLD RUEGG, WILLIAM B. LA BORDE, ERNEST A. FALLER, JR., *Examiners.*